US006442506B1

(12) United States Patent
Treviño (10) Patent No.: US 6,442,506 B1
(45) Date of Patent: Aug. 27, 2002

(54) SPECTRUM ANALYSIS METHOD AND APPARATUS

(76) Inventor: George Treviño, 5027 Brazoswood, San Antonio, TX (US) 78244

( * ) Notice: Subject to any disclaimer, the term of this patent is extended or adjusted under 35 U.S.C. 154(b) by 0 days.

(21) Appl. No.: 09/436,301

(22) Filed: Nov. 8, 1999

(51) Int. Cl.$^7$ .............................................. G06F 17/00

(52) U.S. Cl. ........................... 702/185; 702/74; 702/32; 324/76.22; 324/76.24; 324/76.38

(58) Field of Search .............................. 702/32, 74, 75, 702/76, 79; 324/76.19, 76.21, 76.22, 76.24, 76.38

(56) References Cited

U.S. PATENT DOCUMENTS

| | | | | |
|---|---|---|---|---|
| 3,991,365 A | * | 11/1976 | Takeuchi | 324/78 |
| 4,415,767 A | * | 11/1983 | Gill et al. | 381/45 |
| 4,885,790 A | * | 12/1989 | McAulay et al. | 381/36 |
| 5,565,764 A | * | 10/1996 | Priebe et al. | 324/76.21 |
| 6,298,315 B1 | * | 10/2001 | Li et al. | 702/180 |

FOREIGN PATENT DOCUMENTS

EP 0298786 A1 1/1989

OTHER PUBLICATIONS

Fukasawa et al. 1993,IEEE, p2272–2275.*
Spanias, IEEE, 1990.*
Stine et al. Feb. 97, IEEE, vol. 10 No. 1, p24–40.*

Joel Le Roux,"Optimal Design of Windows for Spectral Analysis of Mono and Bidimensional Sampled Signals", Proceedings of the International Conference on Acoustics, Speec and Signal Processing, New York, IEEE Conf. Mar. 17, 1992, pp. 501–504.

Joel Le Roux et al., "A Cost Minimization Approach for Optimal Window Design in Spectral Analaysis of Sampled Signals," IEEE, vol. 40, No. 4, Apr. 1, 1992, New York, pp. 996–999.

* cited by examiner

*Primary Examiner*—Marc S. Hoff
*Assistant Examiner*—Paul Kim
(74) *Attorney, Agent, or Firm*—Brian F. Russell; Bracewell & Patterson, L.L.P.

(57) ABSTRACT

A method and apparatus for spectral analysis of a sampled signal are provided. According to the method, a first time interval ΔT is determined which represents a sample set over which the signal can be averaged for purpose of decomposing the signal into instantaneous mean and random components. From random component of the signal, the optimal time-dependent time interval AW over which the random component should be averaged to obtain the instantaneous frequency spectrum (IFS) is then calculated based upon the instantaneous signal memory. Signal memory specifies the extent in time beyond which the signal "forgets" its past behavior and thus is a measure of its degree-of-randomness. Defining AW in this way reduces the likelihood that short-lived events are lost (or masked) due to uncharacteristically short (or long) averaging intervals. Importantly, both time intervals ΔT and AW are dynamic and vary randomly with time. Because these intervals can be computed in real time, the instantaneous frequency spectrum over interval AW can also be computed in real time.

25 Claims, 2 Drawing Sheets

SPECTRUM ANALYSIS METHOD AND APPARATUS

BACKGROUND OF THE INVENTION

1. Technical Field

The present invention relates in general to signal processing and in particular to a method and apparatus for spectral analysis of a signal. Still more particularly, the invention relates to a method and apparatus for real-time spectral analysis that determine two time-dependent intervals over which a signal should be analyzed to decompose it into its instantaneous mean and random components and to determine its instantaneous frequency spectrum (IFS).

2. Description of the Related Art

Spectral analysis is the decomposition of a signal into its sinusoidal components. Just as sunlight can be decomposed into a rainbow by a prism, a sampled signal can be decomposed into frequencies by an applicable algorithm. And just as a rainbow can be blended back into sunlight by passing its constituent colors through an inverted prism, a signal can be reconstructed by combining its component sinusoids.

Different signals, like chemical elements when heated to incandescence, manifest their own characteristic spectrum. A signal's spectrum thus provides an identity or signature in the sense that no other signal has the same spectrum. From this spectrum emerge all parameters necessary to quantify the instantaneous statistical character of the signal. Phase information about the signal, however, is lost.

Hereafter, spectral analysis, unless stated otherwise, refers specifically to time-varying spectral analysis. Time-varying spectra are common in everyday life because dynamic phenomena are common in everyday life. For example, a standard musical score represents a time-varying spectrum because it indicates to a musician what notes (i.e., frequencies) should be played as time progresses. A viable time-varying spectral analysis algorithm must determine which frequencies exist in a random signal at a particular instant in time.

Conventional spectral analysis entails the decomposition of a time-varying signal into its instantaneous mean and deviations from the mean. These two components are also referred to as the systematic (or DC) component and random component, respectively. For sampled signals, the systematic and random components are independent of one another, meaning that two different signals can have the same random component but different means, and vice versa. In other words, one particular mean is not necessarily linked to one particular random part.

Presently available spectral analysis algorithms are all non-real-time and use a single user-defined averaging interval (or window) for analyzing a random signal. Specifically, conventional spectral analysis algorithms require that the user "guess" the requisite magnitude of the time-dependent averaging interval over which a signal is to be continually analyzed. The extent of the selected interval is a reflection of the user's perception of how the signal properties are changing, or will change, with respect to time. (See, for example, Jones, D. L., & Parks, T. W.:1990, 'A High Resolution Data-Adaptive Time-Frequency Representation', IEEE Trans. Acous., Speech, and Sig. Proc. 38, 2127–2135; Jones, G., & Boashash, B.: 1997, 'Generalized Instantaneous Parameters and Window Matching in the Time-Frequency Plane', IEEE Trans. Sig. Proc. 45, 1265–1275; and Katkovnik, V. & Stankovic, L.: 1998, 'Instantaneous Frequency Estimation Using the Wigner Distribution with Varying and Data-Driven Window Length', IEEE Trans. Sig. Proc. 46, 2315–2325.) Such guessing introduces biases which degrade IFS computation, because even educated guessing cannot reliably emulate changing features of random signals, in real-time or otherwise.

Often, a user employs an averaging interval of large constant extent for all portions of signal, in the belief that incorporation of a substantially large amount of information will produce a statistically valid "parameterized" IFS. The parameter in question is the magnitude of the overly large constant averaging interval, which the user believes can be "scaled" out later. Such approaches contaminate the produced result because changes in signal properties are due to physical forces whose time-dependent features cannot be completely characterized by changes in time scales only (e.g., recall that forces have dimensions of (mass)×(acceleration)).

The use of a large constant averaging interval also contaminates the produced result whenever "too much" information is included within the interval because signals have a natural property that defines how far back in time present characteristics are connected to earlier ones. Thus, the inclusion of too much information within the averaging interval risks the possibility that past signal behavior, which is completely unrelated to immediate behavior, is incorporated into the IFS computation. This has the same effect as two (or possibly three) pianists, for example, playing the same piece of music, but not in synchrony with one another the listener has difficulty focusing on the true melody.

Use of too much information also leads to an anomaly referred to as 1/f noise (e.g., see Keshner, M.: 1982, '1/f Noise', Proc. IEEE 70, 212–218). Use of overly long intervals also increases the likelihood that significant short-lived events (intermittency) are masked by uncharacteristically long averaging (see, e.g., Gupta, A. K.: 1996, 'Short-Time Averaging of Turbulent Shear Flow Signals', in G. Treviño et al. (eds.), Current Topics in Nonstationary Analysis, World-Scientific, Singapore, pp. 159–173.)

Some currently available spectral analysis algorithms also use information from the future, and in so doing assume that future behavior impacts present behavior. A common example of this approach is to define frequency information from time information according to $$F(p, \omega, M) = \left(\frac{1}{\sqrt{(M)(SR)}}\right) \sum_{n=p}^{p+M-1} S(n) \exp\left[-i\left(\frac{\omega}{SR}\right)(n-p)\right] \quad [1]$$

where S(n) represents a signal in discrete form, p is an integer denoting the present, ω is frequency in radians per second, and M is a p-dependent integer assigned by the user consistent with some user-specified criterion.

For ω=0, the symbol $$\sum_{m=p}^{p+M-1}$$

denotes $$\left(\frac{1}{\sqrt{(M)(SR)}}\right)\{S(p) + S(p+1) + S(p+2) + \ldots + S(p+M-1)\} \quad [2]$$

where m takes on the integer values p,p+1,p+2, . . . ,p+M−1; for non-zero values of ω, the symbol denotes correspondingly similar expressions. Another approach is given by $$F(p, \omega, M) = \left(\frac{1}{\sqrt{(2M+1)(SR)}}\right) \sum_{n=p-M}^{p+M} S(n)\exp\left[-i\left(\frac{\omega}{SR}\right)(n-p)\right] \quad [3]$$

Note that both of these approaches require information beyond the present, and as such are non-causal. The formulations are also non-real-time since they require knowledge of the signal at p+1,p+2,p+3, . . . ,p+M−1, which denote instants in time later than p, to define a signal property at p. In a world governed by entropy and its companion irreversibility, assignations such as [1] and [3] cannot be relied on to produce even near real-time information.

Also note these approaches use the same user-defined averaging interval (M) for all components of the signal. The specific components intended here are the p-dependent DC component (mean), defined by multiplying equation [2] by $$\sqrt{(SR)/M}$$

and the random component, defined by subtracting the p-dependent DC component from the signal. Since a signal is a time history of some random-varying physical phenomenon, there is no assurance the above user-selected M is compatible with (i.e., "matches") the window peculiar to instantaneous properties of the signal. Accordingly, the potential for a conflict between what the user imposes and what the signal manifests is prohibitive.

Last, a popular algorithm called the Fast Fourier Transform (FFT) requires the magnitude of the analysis window to be defined by a number which is a power of 2 (i.e., $2^M$), where M is (again) specified by the user. As above, since a signal is a time history of some random-varying physical phenomenon, there is no assurance that the M chosen by the user matches the window peculiar to the instantaneous properties of the signal.

SUMMARY OF THE INVENTION

In view of the foregoing shortcomings in the art, the present invention provides a method and apparatus for real-time assessment of the time-dependent intervals over which a signal should analyzed to determine the signal's IFS. From the signal and the accuracy of the sampling device, a determination is made, in real-time, of the minimum time-dependent time interval (ΔT) over which the signal should be analyzed to separate the signal into systematic and random components. From the random component, the optimal time-dependent interval (AW) for analyzing the signal with intent to compute its IFS is determined, also in real time. Even though the properties of the signal may change over time, the properties are nonetheless taken to be constant over the extent of AW only. The use of these two real-time signal and accuracy-defined windows for signal analysis distinguishes the present invention from available algorithms, all of which are non-real-time and use the same user-defined window for analyzing both the systematic and random signal components.

For real signals, the ΔT and AW intervals computed by the present invention are dynamic and vary randomly with time. When coupled with the periodogram version (see, e.g., Schuster, A.: 1898, 'On the Investigation of Hidden Periodicities with Application to a Supposed 26 Day Period of Meteorological Phenomena', J. Geophys. Res., 3, 13–41) of the short-time Fourier transform (STFT), the ΔT and AW intervals endow this STFT version of a signal with the capacity to estimate IFS. STFT is the accepted method for tracking changes with respect to time in frequency content, distribution, domain, and bandwidth, and procedures for its implementation can be found in Cohen (see, Cohen, L.: 1995, Time-Frequency Analysis, Prentice-Hall, N.J., 299). Once the instantaneous ΔT and AW intervals and the instantaneous systematic and random components are identified, these quantities, as well as the IFS of the random component, can be continually presented to a user via a display to permit real-time visual assessment of the particular changing features of the signal.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention pertains to real-time spectral analysis of data gathered from random-varying physical phenomena and other complex systems. Data related to the physical phenomena, which are recorded with an electronic device at a known sampling rate (SR), in samples per second, and at some manufacturer-specified accuracy (ACC), are herein defined as a signal.

A central focus of the present invention is the real-time estimation of the two time-dependent intervals over which a signal should be analyzed to decompose the signal into systematic and random components and to determine its instantaneous frequency spectrum (IFS), respectively. Thus, the present invention first determines, in real time, the minimum time-dependent time interval ΔT over which a signal should be analyzed to separate the signal into its instantaneous mean (or systematic component) and random component. From the random component the present invention then determines, also in real time, the optimal time-dependent time interval AW for analyzing a signal with intent to determine its IFS.

Figure 1:
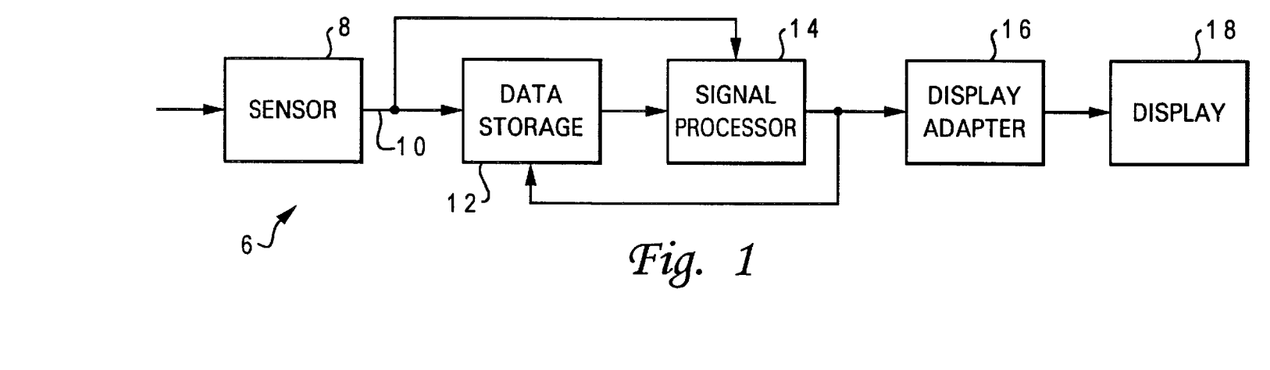
FIG. 1 illustrates an exemplary apparatus for performing spectral analysis on an input signal in accordance with the present invention.
Figure 2:
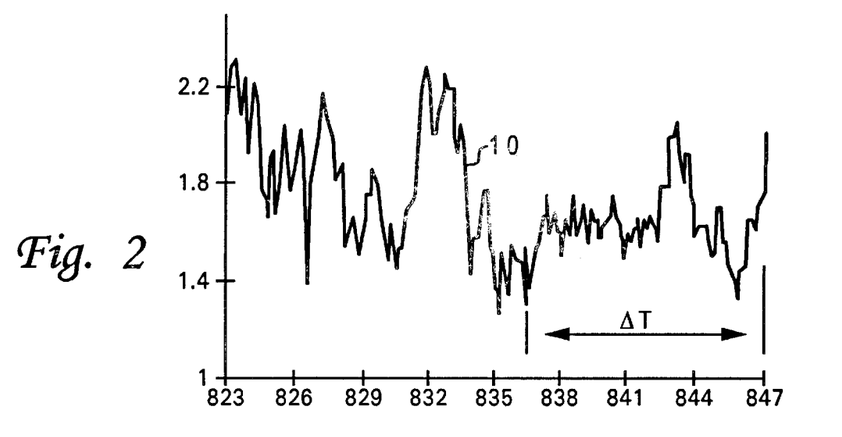
FIG. 2 depicts an exemplary time-varying signal for which real-time spectral analysis can be performed in accordance with the present invention.

With reference now to the figures and in particular with reference to FIG. 1, there is illustrated an exemplary apparatus that may be utilized to implement the present invention. Apparatus 6, which may comprise a spectrum analyzer or other data processing system, includes a sensor 8 that samples any time-varying phenomenon a known sampling rate (SR) and digitizes the sampled data at some manufacturer-specified accuracy (ACC) to produce a signal 10. FIG. 2 illustrates an exemplary signal 10, which can represent any time-varying sampled phenomenon, such as the Dow Jones Industrial Average, instantaneous temperature, corporate income, brain activity, etc. In FIG. 2, signal 10 is plotted with time in minutes on the X axis and units of magnitude (value) on the Y axis. The plot of signal 10 terminates at time 0847, which represents a present (real) time.

The time-value-pair samples comprising signal 10 are recorded in data storage 12 and are also provided in real-time to signal processor 14. In accordance with a preferred embodiment of the present invention, signal processor 14 utilizes a current time-value pair and historical time-value pairs within signal 10 to compute the $\Delta T$ and AW intervals discussed above, as well as the real-time systematic and random components and IFS of signal 10. Procedurally, though, $\Delta T$ is determined first, from which follows identification of mean and random components. From random component comes AW and ultimately the IFS. These characteristics of signal 10 can then be stored within data storage 12, provided to display adaptor 16 for presentation within display 18, or utilized as inputs to a control system (not illustrated) designed to respond to the instantaneous character of signal 10 and thus the behavior of the monitored phenomenon. As will become apparent from the following description, the spectral analysis performed by signal processor 14 can be performed by hardware, software, firmware or a combination of these.

Figure 3:
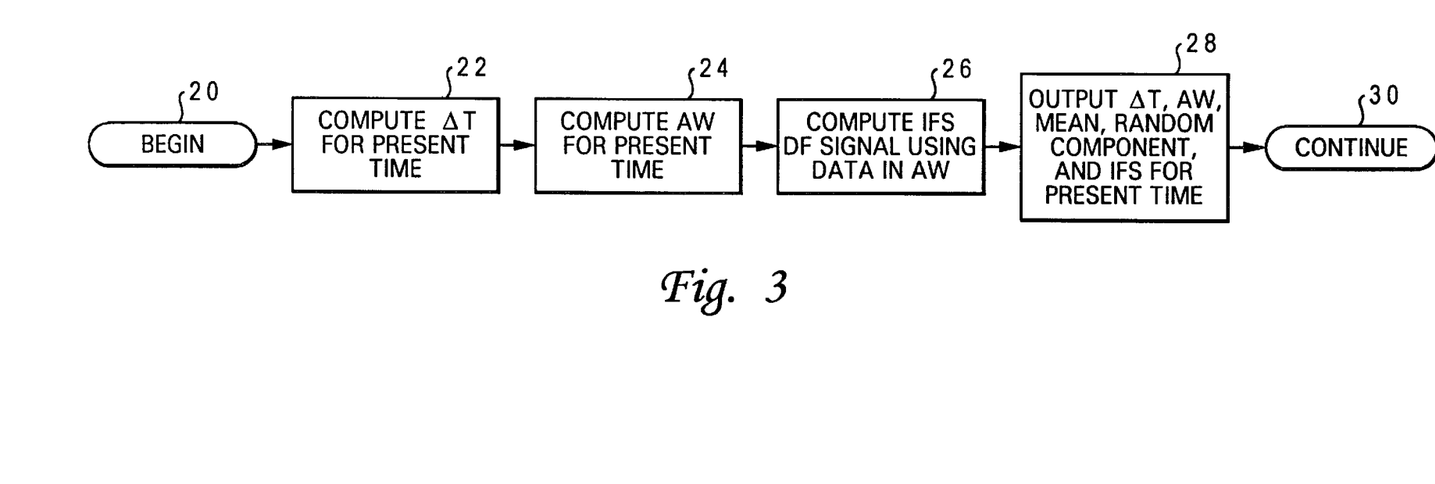
FIG. 3 is a high level logical block diagram of a method of spectral analysis in accordance with the present invention.

Referring now to FIG. 3, there is depicted a high level logical flow diagram of a method of spectral analysis that may be performed by signal processor 14 in accordance with the present invention. As shown, the process begins at block 20 and then proceeds to block 22, which depicts signal processor 14 determining the time-dependent interval $\Delta T$ peculiar to the present time. Thus, at the present time, say 0847, after some history of signal 10 has been stored within data storage 12, signal processor 14 begins to perform spectral analysis of signal 10 by determining, from ACC, SR and the properties of the random part of signal 10, the requisite $\Delta T$ peculiar to 0847. As illustrated in FIG. 2, $\Delta T$ is roughly 10.5 minutes for the exemplary signal 10. Importantly, in contrast to conventional spectral analysis algorithms, $\Delta T$ is determined at time 0847 (i.e., in real time) using only present data and data from the immediate past; no future data (i.e., no time-value pairs from beyond 0847) are utilized. Moreover, no interactive or user-supplied input other than ACC and SR is needed or utilized to determine $\Delta T$.

Figure 4:
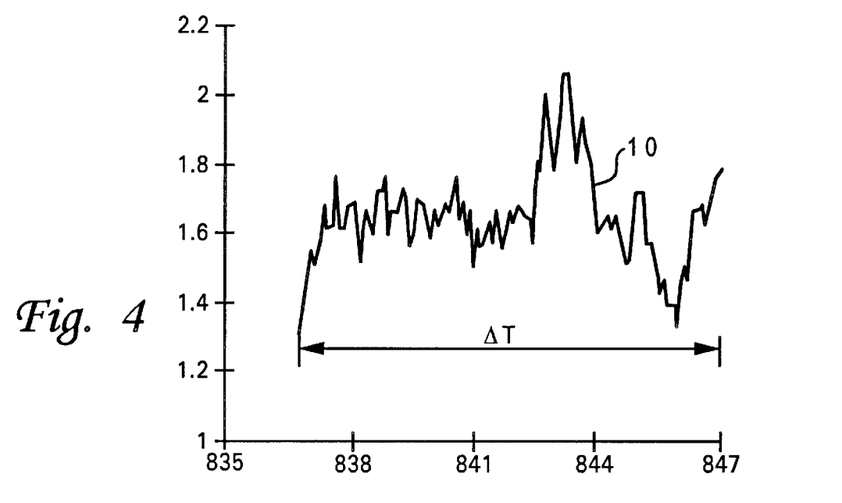
FIG. 4 depicts a segment of time-varying signal of FIG. 2 designated by the time-varying interval AT, which defines the set of data samples over which the signal should be analyzed for decomposition into its mean and random components.
Figure 5:
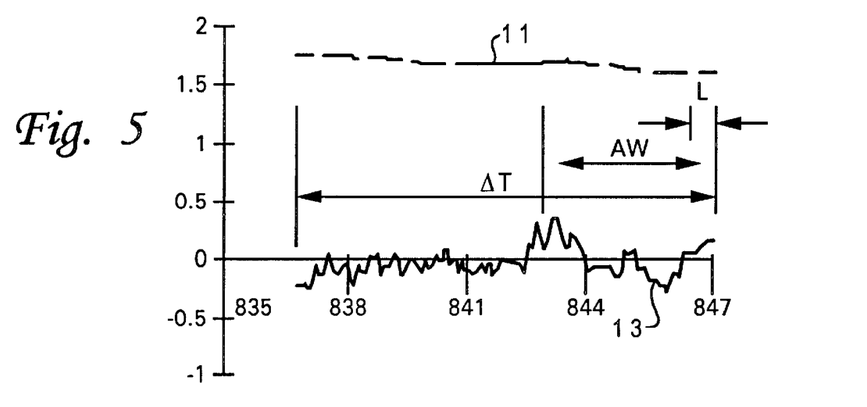
FIG. 5 illustrates the mean and random components of the signal from FIG. 1 during interval ΔT, as well as the interval AW, which is the optimal time-varying interval for analyzing the signal to determine its instantaneous frequency spectrum.

As time evolves, say to 0848 or perhaps even 0912, signal processor 14 will compute another $\Delta T$ compatible with that instant of time. A user preferably has option of specifying this real-time increment (to 0848 or to 0912), although signal processor 14 can automatically recalculate $\Delta T$ at real-time increments of $SR^{-1}$, or combinations thereof, e.g., $(10SR)^{-1}$. Successive computations of this nature define the best segmentation of signal 10 compatible with ACC and the properties of random component of signal 10. The time-dependent interval $\Delta T$ for time 0847, which is related to N according to $\Delta T=N/SR$, is illustrated in FIG. 4. $\Delta T$ defines the interval over which signal 10 should be analyzed for decomposition into its instantaneous mean 11 and random component 13, as shown in FIG. 5.

To compute $\Delta T$, signal 10 is first averaged according to:

$$\overline{S}(p, N) = \left(\frac{1}{N}\right) \sum_{n=p-N+1}^{p} S(n) \qquad [4]$$

where p is an integer designating the presents, N is the number of signal values being averaged, and n is a dummy variable representing a sample point included within the average. The actual (real) time corresponding to p is p/SR. The quantity defined by equation [4] identifies the DC (i.e., systematic) component at the present time as a numerical average of N signal values, one of those being its present value and the remaining N−1 being its most recent past values. Such an average is called a real-time average because only present and immediate past data are used; no information from the future is employed (cf. equation [1]). A common example of such real-time averaging is "income averaging" for IRS tax purposes. In income averaging, the taxable income for the current year is defined as the average of the present year's income averaged with total income from the previous four years (five years total). Thirty, sixty, and ninety-day Dow Jones Industrial Averages (DJIA) are computed in the same way.

The intent of equation [4] is to determine how large N should be (i.e., how far back in time to average) such that $\overline{S}(p,N)$ estimates the mean of signal at p. The requisite N is itself p-dependent for all signals, meaning the requisite value for p=63, is not necessarily the same as the requisite for p=81, or p=97, etc. The only signals for which equation [4] is independent of p are idealized signals, denoted in the signal analysis community as stationary signals. Signals as defined herein, however, are never stationary.

For equation [4] to be a reliable measure of the instantaneous mean of signal, N must be on the order of magnitude of the related time scale ($\Delta T$) of signal 10; specifically, $N=(\Delta T)(SR)$. Once that scale is matched, though, $\overline{S}(p,N)$ loses its dependence on N and becomes simply $\overline{S}(p)$. As time advances, different Ns are identified and signal 10 is accordingly partitioned into successive intervals that define its best segmentation compatible with ACC and properties of its random part (cf., Lavielle, M.: 1998, 'Optimal Segmentation of Random Processes', IEEE Trans. Sig. Proc. 46, 1365–1373).

The requisite N (and therefore $\Delta T$) is identified by analyzing the mean square error (MSE) defined from the random part of signal 10 according to $$\text{m.s.e} = \left(\frac{1}{N}\right)^2 \left[\sum_{n=p-N+1}^{p} x(n, N)\right]^2 \qquad [5]$$

where $$x(p,N)=S(p)-\overline{S}(p,N) \qquad [6]$$

denotes the random part. The quantity defined by equation [6] may be efficiently evaluated by beginning with N equal to 1 and then increasing N by successive doubling. Successive values of N are therefore 2, 4, 8, etc. This procedure is imposed for the purpose of introducing speed into the determination. Note that for signals, the p-dependence of the MSE is never lost (nonstationarity).

For example, suppose p=46 (the 46th value in the sequence defining signal 10), and N is 8. The quantity $\overline{S}(46,8)$ is defined from equation [4] using the eight values S(46), S(45), S(44), . . . , S(39). The quantity x(46,8) in equation [6], on the other hand, is defined from S(46) and $\overline{S}$(46,8). In equation [5], MSE is defined from the eight values x(46,8), x(45,8), x(44,8), . . . , x(39,8), where x(39,8) is defined from S(39) and $\overline{S}$(39,8).

Note first that the successive quantities $\overline{S}$(46,8), $\overline{S}$(45,8), $\overline{S}$(44,8), . . . , $\overline{S}$(39,8) are not necessarily equal to one another, since they are determined from different, although equal length, segments of signal 10. The only way these quantities could all equal one another would be if signal 10 has a constant mean, in which case equation [4] would be independent of p (stationary mean). Signals, though, have a nonstationary mean, and there will be some variation from one N-defined segment of signal 10 to the next. Note second that defining $\overline{S}$(39,8) requires signal values as far back as S(32). Last, note that defining the N x's for use in equation [5] requires 2N−1 total values of signal 10.

For large N the value of equation [5] approaches zero, since some of the values of the random part are positive and some negative. This is what "random" implies. The average of the random part, however, is not necessarily zero. That is, it does not follow that $$\left(\frac{1}{N}\right)\sum_{n=p-N+1}^{p} x(n, N) = \overline{x}(p, N) = O \quad [7]$$

although it does follow that $\overline{x}(p,N)$ is a small number for all p and large enough N. This property makes the quantity within brackets in equation [5] bounded. Thus, as N gets progressively larger, MSE approaches zero.

In numerical work, however, MSE is taken to be zero whenever MSE becomes smaller than the square of ACC. ACC, recall, is specified by the manufacturer of the device (e.g., sensor 8) that records and digitizes signal 10. The smallest N which yields this MSE is the value for which (i) a viable estimate of the instantaneous mean can be defined, and (ii) a valid assessment of the corresponding random part can be determined. For example, if ACC is specified as ±1% of the instantaneous value of signal 10 by the manufacturer of sensor 8, it is understood that, on average, ACC=0.01$\overline{S}$(p). The magnitude of N for the above analysis is therefore defined through $$\left(\frac{1}{N}\right)^2\left[\sum_{n=p-N+1}^{p} x(n, N)\right]^2 < 10^{-4}\overline{S}^2(p) \quad [8]$$

As illustrated in FIG. 3, once the interval ΔT (and therefore the random component 13 over ΔT) has been determined for signal 10, the optimum interval AW over which the IFS of signal 10 should be computed is determined, as shown at block 24. In accordance with the present invention, the p-dependent extent of AW is determined from a property of signal 10 denoted as L and defined by $$L(p) = \max \frac{\left[\sum_{n=p-B}^{p} x(n, N)\right]^2}{2(SR)\sum_{n=p-B}^{p} x^2(n, N)} \quad [9]$$

where B is an integer which varies between O and N. Note that L has the dimension of time, and that equation [9] is a sequence of N+1 numbers, where each member of the sequence is itself determined from a combination of random numbers (the x's).

For example, for B=0 the quantity within { } in equation [9] is simply $$\frac{x^2(p, N)}{2(SR)x^2(p, N)} = \frac{0.5}{SR} \quad [10]$$

for B=1 it is $$\frac{[x(p, N) + x(p-1, N)]^2}{2(SR)[x^2(p, N) + x^2(p-1, N]} \quad [11]$$

and for B=N $$\frac{[x(p, N) + x(p-1, N) + \ldots + x(p-N, N)]^2}{2(SR)[x^2(p, N) + x^2(p-1, N)] + \ldots + x^2(p-N, N)]} \quad [12]$$

L is the maximum of this sequence of N+1 random numbers.

An interpretation for L is provided by considering an explicit case. Suppose p=152 and the requisite N has been found to be 64. L in this case is the largest value in a sequence of 65 random numbers. Consider the second number in this sequence, $$\frac{[x(152, 64) + x(151, 64)]^2}{2(SR)[x^2(152, 64) + x^2(151, 64)]} \quad [13]$$

This number quantifies the effect of the single "mixed" product 2x(152,64)x(151,64) in the sense that if this product were absent, the number in question would be defined strictly by SR. The fifth number in the sequence likewise quantifies the effect of 10 similar products, and the Nth number the effect of N(N−1)/2 such products. Note that even though equation [9] always yields a value greater than zero for all signals, some of the mixed products will likely be negative.

Since for larger and larger N the corresponding numbers in the sequence defining L begin to approach zero (see, e.g., equation [5]), L is that value in the sequence at which the combined effects of the mixed products are maximized. The value of B corresponding to this L thus designates that point in the sequence beyond which the combined effect of the mixed products begins to dissipate.

Since these products collectively quantify how well "present" values of the random part connect with "past" values, such as the connection of p=152 with n=147, p=152 with n=144, p=152 with n=141, etc., L can be designated signal memory in the sense that for values of signal 10 separated (in time) by more than L, signal 10 begins to "forget" or "disconnect" with its past.

L(p) is thus a measure of the degree-of-randomness of signal 10. A small L corresponds to a highly random (short memory) signal, and a large L corresponds to a less random signal. A particular signal can be highly random for one value of p, and yet not-so-random for another value. A highly random signal has minimal connection with its past, and a not-so-random signal has significant connection with its past.

An interesting property of L is identified by re-examining the sequence of numbers defined by equations [10] through [12]. Suppose again p=152 and N=64. Note that if the order of the, say 35th, 36th, and 37th, numbers in the complete 65 number sequence is inverted (or scrambled), the value of L(p) is unchanged (invariant). The same is true if instead the 11th, 12th, and 13th, numbers are likewise re-ordered; or the 51st, 52nd, and 53rd, etc. According to Keyser (Keyser, C. J.: 1904–05, 'The Universe and Beyond: The Existence of the Hypercosmic', The Hibbert Journal 3, 300–314), such invariance is a manifestation of "changelessness in the midst of change, abiding things in a world of flux, configurations that remain the same despite the swirl and stress of countless hosts of curious transformations." It establishes that L(p) is a "natural" feature of signal 10 in the sense L(p) is immune to "local" re-arrangement of the values in the sequence that defines it.

In view of this interpretation, the length of interval AW is preferably selected to be between 1L and 20L, and most preferably, approximately 10L. Defining AW this way accrues a number of benefits. First, defining AW as a particular multiple of L insures that (i) a representative sample of the random part 13 is analyzed, and (ii) all influence of past signal values is lost within interval AW. Second, defining AW as 10L reduces the likelihood that significant short-lived events are lost (or masked) due to uncharacteristically short (or long) AWs. Third, defining AW in this way also insures enough information is used to eliminate "end-effects" in IFS caused by analyzing signal 10 over a finite interval. Fourth, defining AW in this way also insures the user is using AW to analyze signal 10, and not vice versa. The mathematics of Fourier analysis makes no distinction.

Since the spectrum of a random signal can be determined only for stationary signals, defining AW in this way requires that signal be stationary only over the extent of AW, but not over the extent of $\Delta T$. A note of caution is due here; the requisite stationarity over the extent of AW might suggest to one not-so-skilled in the art that FFT could be invoked to educe associated frequency information. This, unfortunately, is not the case because, as indicated earlier, FFT requires the magnitude of the analysis window be defined by a number which is a power of 2 (i.e., $2^M$). There is no a priori way of guaranteeing AW will comply with this condition.

As time advances, different AWs are identified and the random component of signal 10 is accordingly partitioned into successive intervals that define the best segmentation of signal 10 compatible with the memory of signal 10 from which to compute the IFS of signal 10. In the example given in FIG. 5, L, the memory of signal 10 at time 0847, is approximately 24 seconds and AW is accordingly selected to be approximately 4 minutes. As shown in block 26 of FIG. 3, once L and AW are determined from random component 13 of signal 10, the IFS of signal 10 at time 0847 can be determined in a conventional manner (e.g., by STFT) utilizing only time-value pairs within interval AW. As depicted at block 28, $\Delta T$, AW, instantaneous mean 11, random part 13, and the IFS of signal 10 can then be output by signal processor 14 for display, storage, control processing, etc. Thereafter, real-time spectral analysis of signal 10 continues at block 30 with the computation of a new $\Delta T$ for a subsequent present time.

As has been described, the method and apparatus for spectral analysis of the present invention have a number of benefits vis-a-vis conventional spectral analysis methods and apparatus. In particular, the present invention (i) determines the interval $\Delta T$ of a signal over which the signal should be decomposed into its systematic and random components; (ii) independently determines the interval AW which manifests the frequencies that presently exist in the signal; (iii) eliminates a user "guessing" a time-dependent interval over which a signal is to be analyzed; (iv) avoids degradation caused by assuming that future signal samples impact the present IFS; (v) reduces the likelihood that short-lived events are lost or masked due to selection of uncharacteristically short (or long) averaging intervals; and (vi) eliminates the occurrence of 1/f noise.

Because of the ability of the present invention to decompose on-line (real-time) a rather general nonstationary time series into frequency information, the present invention has broad applicability to many scientific disciplines, e.g., geophysical, oceanic, biological or atmospheric sciences, as well financial and engineering applications. In the atmospheric sciences, the present invention has applications in instantaneously quantifying turbulence. In other fields, such as the earth sciences, it can be used to decompose measurements of ground displacements due to earthquakes or to man-made sources such as underground detonations. These signals are always nonstationary. Application to the analysis of earthquakes motions is particularly interesting because earthquakes are usually described by their Richter Scale magnitude. The proposed spectral analyzer would characterize them by their frequency information as well. In the communications field, the proposed analyzer can be used in network control and optimization.

Other applications include sonar systems for target detection and identification and spectral analysis of electrocardiograms (and electroencephalograms) in the medical profession. Often these types of signals are changing with time due, for example, to a moving target or the decaying condition of a malfunctioning heart. Improvements in signal processing and display, such as the one proposed here, can reduce false alerts to an acceptable level. A spectral analyzer which can quantify, in real-time, the rate of decay can be used to more accurately assess the condition of an ailing patient.

Applications in the manufacturing field include analyzing the roughness of machined surfaces. As a vibration sensor it can be used to shut off rotary and reciprocating equipment before vibrations caused by worn bearings, or other malfunctions, damage machinery or equipment connected to the machinery. In the educational arena, spectral analyzers can be used as teaching tools, allowing students of science and engineering to see first hand an on-line analysis of the frequency content of a random signal. There are also applications in the field of voice recognition. A rather peculiar application is the real-time analysis of stock-market fluctuations, with its inherent coupling between large-scale and small-scale fluctuations.

In the aeronautical field, expensive wind-tunnel tests of prototype aircraft are always faced with problem of ascertaining when a given test has run long enough to insure enough data has been collected for viable assessment of the aerodynamic properties of the prototype being tested. The present invention can be used to establish when the test parameters have achieved their steady-state condition, and thus provide engineers with accurate information that can be utilized to determine when to terminate the test.

Any publications mentioned herein are indicative of the level of skill in the art to which the present invention pertains. These publications are incorporated by reference to the same extent as if each was specifically and individually indicated to be incorporated by reference. One skilled in the art will readily appreciate from the foregoing that the present invention is well adapted to carry out the objectives and to obtain the ends and advantages mentioned, as well as those inherent therein. The present examples, along with methods and procedures, are representative of preferred embodiments. They are exemplary and are not intended as limitations on the scope of the present invention. Changes therein and other uses will occur to those skilled in the art which are encompassed within the spirit of the invention as defined by the scope of the appended claims.

For example, although aspects of the present invention have been described with respect to an spectrum analysis apparatus capable of executing software that directs the functions of the present invention, it should be understood that present invention may alternatively be realized as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of spectral analysis of a sampled random signal, wherein said sampled signal includes a plurality of time-ordered samples including a current sample, said method comprising:

determining, from said plurality of time-ordered samples, a first time interval over which a random component can be extracted from said sampled signal;

extracting said random component from said sampled signal over said first time interval;

determining, from said random component, a second time interval; and producing an instantaneous frequency spectrum of said sampled signal at a time corresponding to said current sample, utilizing only said current sample and preceding samples within said second time interval from said current sample.

2. The method of claim 1, wherein determining said first time interval comprises determining said first time interval based upon said random component and an accuracy of said plurality of time-ordered samples.

3. The method of claim 2, wherein determining said first time interval is further based upon a sampling rate of said sampled signal.

4. The method of claim 3, wherein said first and second time intervals are determined utilizing only said plurality of time-ordered samples, said sampling rate, and said accuracy.

5. The method of claim 1, wherein determining said second time interval comprises calculating a signal memory characteristic of said sampled signal at a time corresponding to said current sample and then determining said second time interval from said signal memory.

6. The method of claim 1, wherein producing said instantaneous frequency spectrum comprises producing said instantaneous frequency spectrum in real time.

7. The method of claim 6, wherein producing said instantaneous frequency spectrum comprises producing said instantaneous frequency spectrum utilizing a short-time Fourier transform.

8. The method of claim 1, and further comprising graphically presenting said instantaneous frequency spectrum.

9. The method of claim 1, and further comprising recording said instantaneous frequency spectrum within data storage.

10. A signal analysis apparatus, comprising:

an input channel that receives a sampled signal containing a plurality of time-ordered samples including a current sample; and a signal processor that determines, from said plurality of time-ordered samples, a first time interval over which a random component can be extracted from said sampled signal, extracts said random component from said sampled signal over said first time interval, determines, from said random component, a second time interval, and then produces an instantaneous frequency spectrum of said sampled signal at a time corresponding to said current sample utilizing only said current sample and preceding samples within said second time interval from said current sample.

11. The apparatus of claim 10, wherein said signal processor determines said first time interval based upon said random component and an accuracy of said plurality of time-ordered samples.

12. The apparatus of claim 11, wherein said signal processor determines said first time interval based upon a sampling rate of said sampled signal.

13. The apparatus of claim 12, wherein said signal processor determines said first and second time intervals utilizing only said plurality of time-ordered samples, said sampling rate, and said accuracy.

14. The apparatus of claim 10, wherein said signal processor determines said second time interval by calculating a signal memory characteristic of said sampled signal at a time corresponding to said current sample and then determining said second time interval from said signal memory.

15. The apparatus of claim 10, wherein said signal processor produces said instantaneous frequency spectrum in real time.

16. The apparatus of claim 15, wherein said signal processor produces said instantaneous frequency spectrum utilizing a short-time Fourier transform.

17. The apparatus of claim 10, and further comprising a display coupled to said signal processor that graphically presents said instantaneous frequency spectrum.

18. The apparatus of claim 10, and further comprising data storage coupled to said signal processor that records said instantaneous frequency spectrum.

19. A signal analysis program product, comprising:

a signal processor that determines, from a plurality of time-ordered samples forming a sampled signal, a first time interval over which a random component can be extracted from said sampled signal, extracts said random component from said sampled signal over said first time interval, determines, from said random component, a second time interval, and then produces an instantaneous frequency spectrum of said sampled signal at a time corresponding to a current sample utilizing only said current sample and preceding samples within said second time interval from said current sample; and a data processing usable medium encoding said signal processor.

20. The program product of claim 19, wherein said signal processor determines said first time interval based upon said random component and an accuracy of said plurality of time-ordered samples.

21. The program product of claim 20, wherein said signal processor determines said first time interval based upon a sampling rate of said sampled signal.

22. The program product of claim 21, wherein said signal processor determines said first and second time intervals utilizing only said plurality of time-ordered samples, said sampling rate, and said accuracy.

23. The program product of claim 19, wherein said signal processor determines said second time interval by calculating a signal memory characteristic of said sampled signal at a time corresponding to said current sample and then determining said second time interval from said signal memory.

24. The program product of claim 19, wherein said signal processor produces said instantaneous frequency spectrum in real time.

25. The program product of claim 24, wherein said signal processor produces said instantaneous frequency spectrum utilizing a short-time Fourier transform.

* * * * *

UNITED STATES PATENT AND TRADEMARK OFFICE
CERTIFICATE OF CORRECTION

PATENT NO.     : 6,442,506 B1
DATED          : August 27, 2002
INVENTOR(S)    : George Treviño It is certified that error appears in the above-identified patent and that said Letters Patent is hereby corrected as shown below:

Column 6,
Line 1, after the word "signal" please add -- (S) --.

Signed and Sealed this

Twenty-eighth Day of January, 2003

JAMES E. ROGAN
*Director of the United States Patent and Trademark Office*